July 10, 1962   E. H. WARNE   3,043,583
MEANS FOR EFFECTING A CONNECTION BETWEEN
A COILED SPRING AND ANOTHER PART
Filed Oct. 24, 1960

Inventor
E. H. Warne
By Glascock Downing Seebold
Attys.

United States Patent Office 3,043,583
Patented July 10, 1962

3,043,583
MEANS FOR EFFECTING A CONNECTION BETWEEN A COILED SPRING AND ANOTHER PART
Eugene Harold Warne, Solihull, England, assignor to Joseph Lucas (Industries) Limited, Birmingham, England
Filed Oct. 24, 1960, Ser. No. 64,510
Claims priority, application Great Britain Nov. 2, 1959
1 Claim. (Cl. 267—74)

This invention relates to means for effecting a connection between a coiled spring and another part, the means being of the kind wherein the said part includes a pair of spaced lugs defining between them a recess accommodating a loop at an end of the spring, said lugs having formed in them holes accommodating a pin extending transversely between the lugs and through the loop of the spring.

The object of the invention is to provide means of this kind in a convenient form whereby the pin will normally be prevented from removal without the use of additional parts.

According to the invention means of the kind specified is characterised in that the distance between the holes and the base of the recess is less than the diameter of the wire from which the spring is formed and the pin has a circumferentially extending groove in its portion disposed between the lugs and in which the wire is normally accommodated to limit axial movement of the pin, the extremity of the wire forming the loop being of reduced cross-section in order to admit of the axial insertion or removal of the pin from the loop when relative angular movement has been imparted to the spring and said part.

Figure 1:
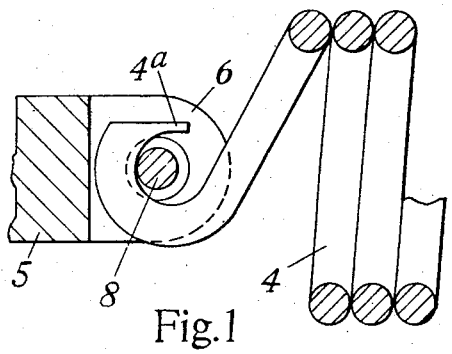
Figure 2:
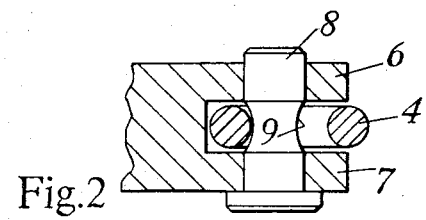
Figure 3:
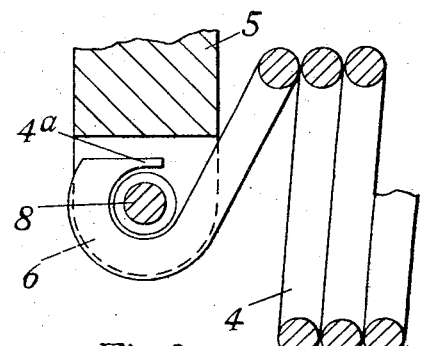

In the accompanying drawings FIGURE 1 is a sectional view illustrating one example of the invention, FIGURE 2 is a sectional plan of FIGURE 1, and FIGURE 3 is a view similar to FIGURE 1 but illustrating the spring and part in a different relative position.

Referring to the drawings the spring 4 is formed from wire of circular cross-section and has formed at one end a loop. The part 5 to which the spring is to be attached has a pair of spaced lugs 6, 7 defining between them a recess in which the loop of the spring is accommodated and retained by means of a pin 8 extending transversely between the lugs. The pin is accommodated within the holes in the lugs which are disposed at a distance from the base of the recess which is less than the diameter of the wire from which the spring is formed. Moreover, in the portion of the pin 8 which is disposed between the lugs is formed a circumferentially extending groove 9 in which the loop is engaged. Thus the portion of the loop disposed between the pin and the base of the recess by virtue of its engagement with the groove will prevent axial movement of the pin sufficient to withdraw it from the holes in the lugs 6, 7.

In order to admit of the insertion or removal of the pin when connecting or disconnecting the spring 4 and the part 5, the extremity 4a of the loop is formed to a reduced cross-section. Thus by imparting relative angular movement to the spring and the part the extremity of the spring can be brought into the position shown in FIGURE 3 in which it lies between the base of the recess and the pin, in which position the pin can be inserted or withdrawn.

By the present invention, therefore, when the parts are assembled and in use the pin is firmly held against withdrawal without the need for the use of additional parts.

Having thus described my invention what I claim as new and desire to secure by Letters Patent is:

Connecting means comprising in combination a part having a pair of spaced lugs defining therebetween a recess the base of which is defined by said part, said lugs having formed therein a pair of aligned holes respectively, a pin extending through said holes, a circumferentially extending groove in the portion of the pin between said lugs, a spring having at one end a loop accommodated between the pin and said base of the recess, said loop having a cross-section with a diameter exceeding the distance between said holes and said base by an amount less than the depth of said groove, whereby said loop prevents axial withdrawal of the pin, and a portion of reduced cross-section at the extremity of said loop, said portion being movable to a position in which it lies between the pin and said base of the recess to permit axial withdrawal of the pin.

References Cited in the file of this patent

UNITED STATES PATENTS

| | | |
|---|---|---|
| 1,287,034 | Johnson | Dec. 10, 1918 |
| 1,694,944 | Horix | Dec. 11, 1928 |
| 2,743,895 | Tygh | May 1, 1956 |
| 2,787,166 | Wurzel | Apr. 2, 1957 |

FOREIGN PATENTS

| | | |
|---|---|---|
| 957,892 | Germany | Feb. 7, 1957 |